United States Patent [19]
Tasaka et al.

[11] Patent Number: 5,772,557
[45] Date of Patent: Jun. 30, 1998

[54] CONTROL SYSTEM FOR AUTOMATIC TRANSMISSION

[75] Inventors: Masayuki Tasaka, Oosaka; Kenji Suzuki, Okazaki; Yoshihiro Yamada, Anjo; Shinichi Matsui, Nagoya; Tatsuyuki Yoneda, Toyota, all of Japan

[73] Assignee: Aisin AW Co., Ltd., Anjo, Japan

[21] Appl. No.: 780,156

[22] Filed: Dec. 24, 1996

[30] Foreign Application Priority Data

Dec. 28, 1995 [JP] Japan ................................. 7-342987

[51] Int. Cl.⁶ ................................................. F16H 61/06
[52] U.S. Cl. ........................................ 477/162; 477/61
[58] Field of Search ........................... 477/61, 159, 160, 477/162

[56] References Cited

U.S. PATENT DOCUMENTS

| | | |
|---|---|---|
| 4,706,522 | 11/1987 | Nitz ............................................ 477/61 |
| 4,949,595 | 8/1990 | Shimanaka ............................. 477/162 |
| 4,955,259 | 9/1990 | Narita ..................................... 477/162 |
| 5,349,885 | 9/1994 | Yoshimura et al. .................... 477/61 |

FOREIGN PATENT DOCUMENTS

A-5-60215  3/1993  Japan .
A-5-141517 6/1993  Japan .

*Primary Examiner*—Dirk Wright
*Attorney, Agent, or Firm*—Oliff & Berridge, PLC

[57] ABSTRACT

A control system for an automatic transmission, including a frictional engagement element, an adjusted oil pressure producing mechanism for adjusting an oil pressure supplied from an oil pressure source to produce an adjusted oil pressure, a hydraulic servo for applying/releasing the frictional engagement element on the basis of the adjusted oil pressure, an engine load detecting mechanism, a vehicle speed detecting mechanism, an up-shift deciding mechanism for determining whether an up-shift has been executed, and a pressure regulate signal generating mechanism for calculating the regulated target pressure of the adjusted oil pressure, when the up-shift is executed, to output a pressure regulate signal. The adjusted pressure signal producing mechanism corrects the regulated target pressure on the basis of the difference between the present vehicle speed and the vehicle speed at a shift point when the shift is executed under the present engine load.

8 Claims, 9 Drawing Sheets

|   |   | SOLENOID | | | CLUTCH | | | BRAKE | | | | ONE-WAY CLUTCH | | |
|---|---|---|---|---|---|---|---|---|---|---|---|---|---|---|
|   |   | S1 | S2 | S4 | C1 | C2 | C3 | B1 | B2 | B3 | B4 | F1 | F2 | F3 |
| R |   | X | O |   | X | O | X | X | X | O | O | X | X | X |
| N |   | X | O |   | X | X | X | X | X | X | O | X | X | X |
| D | 1ST | X | O |   | O | X | X | X | X | (O) | O | X | O | O |
|   | 2ND | O | O | Δ | O | X | X | O | O | X | O | O | X | O |
|   | 3RD | O | X | Δ | O | X | O | O | O | X | X | O | X | X |
|   | 4TH | X | X | Δ | O | O | O | X | O | X | X | X | X | X |

|  |  | THROTTLE OPENING | | |
| --- | --- | --- | --- | --- |
|  |  | LOW | MID | HIGH |
| KINDS OF SHIFT | 1-2 | a1 | a2 | a3 |
| | 2-3 | b1 | b2 | b3 |
| | 3-4 | c1 | c2 | c3 |

FIG.9

CONTROL SYSTEM FOR AUTOMATIC TRANSMISSION

BACKGROUND OF THE INVENTION

1. Field of the Invention

The invention relates to a control system for an automatic transmission.

2. Description of the Related Art

In the automatic transmission of the prior art, the rotation, as generated by an engine, is transmitted through a torque converter to a transmission so that a shift is executed in the transmission. Moreover, this transmission is equipped with a gear unit composed of a plurality of gear elements, which are activated by applying/releasing the frictional engagement elements such as clutches or brakes to achieve the individual gear stages.

For these achievements, there is arranged a hydraulic circuit which is equipped with hydraulic servos corresponding to the individual frictional engagement elements. By feeding the oil pressure selectively to the hydraulic servos to apply/release, the frictional engagement elements are selectively activated/deactivated.

In a vehicle having the automatic transmission thus constructed, a range is selected when the driver operates the shift lever and the vehicle is accelerated when the driver depresses the accelerator pedal.

The aforementioned control system for the automatic transmission is provided with a shift map so that it determines a gear stage to effect the shift by referring to the shift map on the basis of the throttle opening and the vehicle speed.

In the aforementioned control system for the automatic transmission of the prior art, however, if the accelerator pedal is being depressed as the vehicle is driven and the accelerator pedal is abruptly released, the vehicle speed remains high, but the throttle opening decreases so that the operating point in the shift map exceeds the shift point to effect an off-up shift. As a result, a shock is caused following the engagement of the frictional engagement element. In this case, the off-up shift creates an up-shift in the released accelerator pedal.

Figure 2:
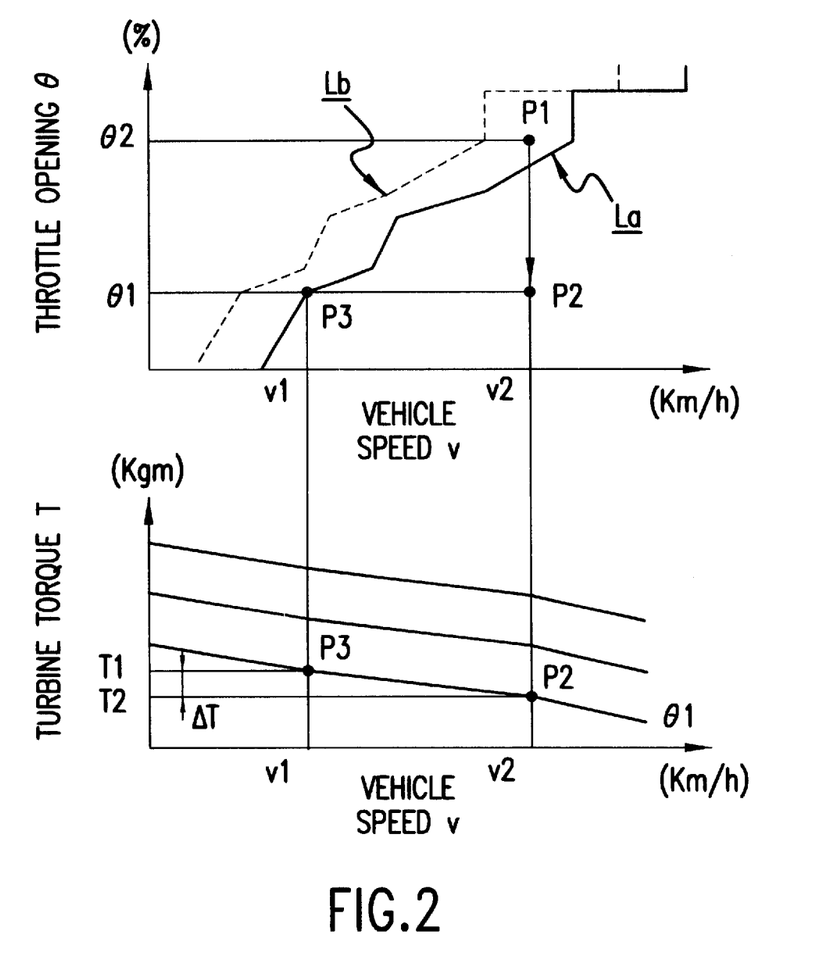
FIG. 2 is a shift characteristic diagram in the automatic transmission of the prior art.

FIG. 2 is a shift characteristic diagram for the automatic transmission of the prior art. Incidentally, the abscissa of FIG. 2 indicates a vehicle speed v, and the ordinates indicate a throttle opening $\theta$ and an input torque (or turbine torque) T.

In FIG. 2, letters La designate a curve indicating a shift point for an up-shift, and letters Lb designate a curve indicating a shift point for a down-shift. Moreover: P1 designates an operation point in which the throttle opening $\theta$ is at $\theta 2$ and in which the vehicle speed v is at v2; P2 designates an operation point in which the throttle opening $\theta$ is at $\theta 1$ and in which the vehicle speed is at v2; and P3 designate an operation point in which the throttle opening $\theta$ is at $\theta 1$ and in which the vehicle speed is at v1.

Usually, if the not-shown accelerator pedal is depressed to a predetermined stroke to set the throttle opening $\theta$ to $\theta 1$ so that the vehicle is driven at the gradually increasing vehicle speed v, the operation exceeds the curve La at the operation point P3 so that the up-shift is effected.

If, on the other hand, the accelerator pedal is abruptly loosened to drive the vehicle at the operation point P2 while the vehicle is being run at the operation point P1 by depressing the accelerator pedal, the vehicle speed v remains high (at v2) whereas the throttle opening $\theta$ decreases (to $\theta 1$), so that the operation exceeds the curve La so that the up-shift is likewise effected.

Incidentally, when the off-up shift is effected at the operation point P2, the throttle opening $\theta$ is at $\theta 1$, and the vehicle speed v is at v2 so that the input torque T to be inputted from the not-shown torque converter to the not-shown transmission is at T2.

On the contrary, when the ordinary up-shift is effected at the operation point P3, the throttle opening $\theta$ is at $\theta 1$, and the vehicle speed v is at v1 so that the input torque T, to be inputted from the torque converter to the transmission, is at T1.

Thus, the present vehicle speed at the off-up shift (the vehicle speed v2 at the operation point P2), is different from the vehicle speed at the shift point at the ordinary up-shift with the present throttle opening $\theta 1$ (the vehicle speed v1 at the operation point P3) so that the input torque T is excessive for the following differential torque $\Delta T$:

$$\Delta T = T1 - T2.$$

Incidentally, the oil pressure to be fed to the not-shown frictional engagement element to be applied/released according to a shift is designed premising the ordinary up-shift, so that the line pressure, as adjusted by a throttle pressure $P_{TH}$ set to match the input torque T1, is fed to the not-shown hydraulic servo.

As a result, at the aforementioned off-up shift, the torque capacity of the frictional engagement element is increased for the differential torque $\Delta T$ so that the shock arises as the frictional engagement element is applied.

SUMMARY OF THE INVENTION

It is an object of the invention to provide a control system for an automatic transmission, which is enabled to prevent the shock at the off-up shift by solving the aforementioned problems of the control system for the automatic transmission of the prior art.

For this object, according to the invention, a control system for an automatic transmission comprises: a frictional engagement element, adjusted oil pressure producing means for adjusting an oil pressure supplied from an oil pressure source to produce an adjusted oil pressure, a hydraulic servo for applying/releasing the frictional engagement element on the basis of the adjusted oil pressure, engine load detecting means for detecting an engine load, vehicle speed detecting means for detecting a vehicle speed, up-shift determining means for deciding whether an up-shift has been executed, and regulated pressure signal generating means for calculating the regulated target pressure of the adjusted oil pressure, when the up-shift is executed, to generate and output a regulated pressure signal matching the regulated target pressure to the adjusted oil pressure producing means.

Moreover, the adjusted pressure signal producing means includes regulated target pressure correcting means for correcting the regulated target pressure target on the basis of the difference between the present vehicle speed and the vehicle speed at the shift point when the shift is executed under the present engine load.

If the up-shift is executed in this case, it is determined by comparing the present vehicle speed and the vehicle speed at the shift point under the present engine load. Next, the regulated target pressure is calculated on the basis of the difference between the two vehicle speeds so that the regulate signal matching the regulated target pressure is generated and outputted to the adjusted oil pressure producing means.

As a result, the proper adjusted oil pressure can be produced to prevent the shock at the off-up shift.

Moreover, the vehicle speed at the shift point under the present engine load can be determined merely by referring to the shift map for the ordinary shift, to thereby simplify the control operation by the regulated target pressure correcting means for correcting the regulated target pressure. Still moreover, any special map for correcting the regulated target pressure need not be prepared so that the ordinary shift map can be utilized to reduce the cost.

In another control system for an automatic transmission of the invention, moreover, the regulated target pressure correcting means corrects the regulated target pressure in accordance with the kind of shifts.

In this case, the regulated target pressure can be corrected to match shift characteristics for each kind of shift and characteristics of the frictional engagement element to be applied at the shift time, to thereby prevent the dispersion in the correction of the regulated target pressure for each kind of shift.

In still another control system for an automatic transmission of the invention, moreover, the regulated target pressure correcting means corrects the regulated target pressure in accordance with the engine load based on torque converter characteristics.

In this case, the regulated target pressure can be corrected to match an input torque to thereby prevent the dispersion in the correction of the regulated target pressure when the engine load fluctuates.

In the control system for an automatic transmission of the invention, moreover, the regulated target pressure correcting means corrects the regulated target pressure during the time period from the output of a shift signal to the detection of a shift start.

In this case, the adjusted oil pressure can be set to the proper value before the shift start is detected.

BRIEF DESCRIPTION OF THE DRAWINGS

The preferred embodiments of this invention will be described in detail, with reference to the following figures, in which.

DESCRIPTION OF THE PREFERRED EMBODIMENTS

The invention will be described in detail in connection with its modes of embodiment with reference to the accompanying drawings.

Figure 1:
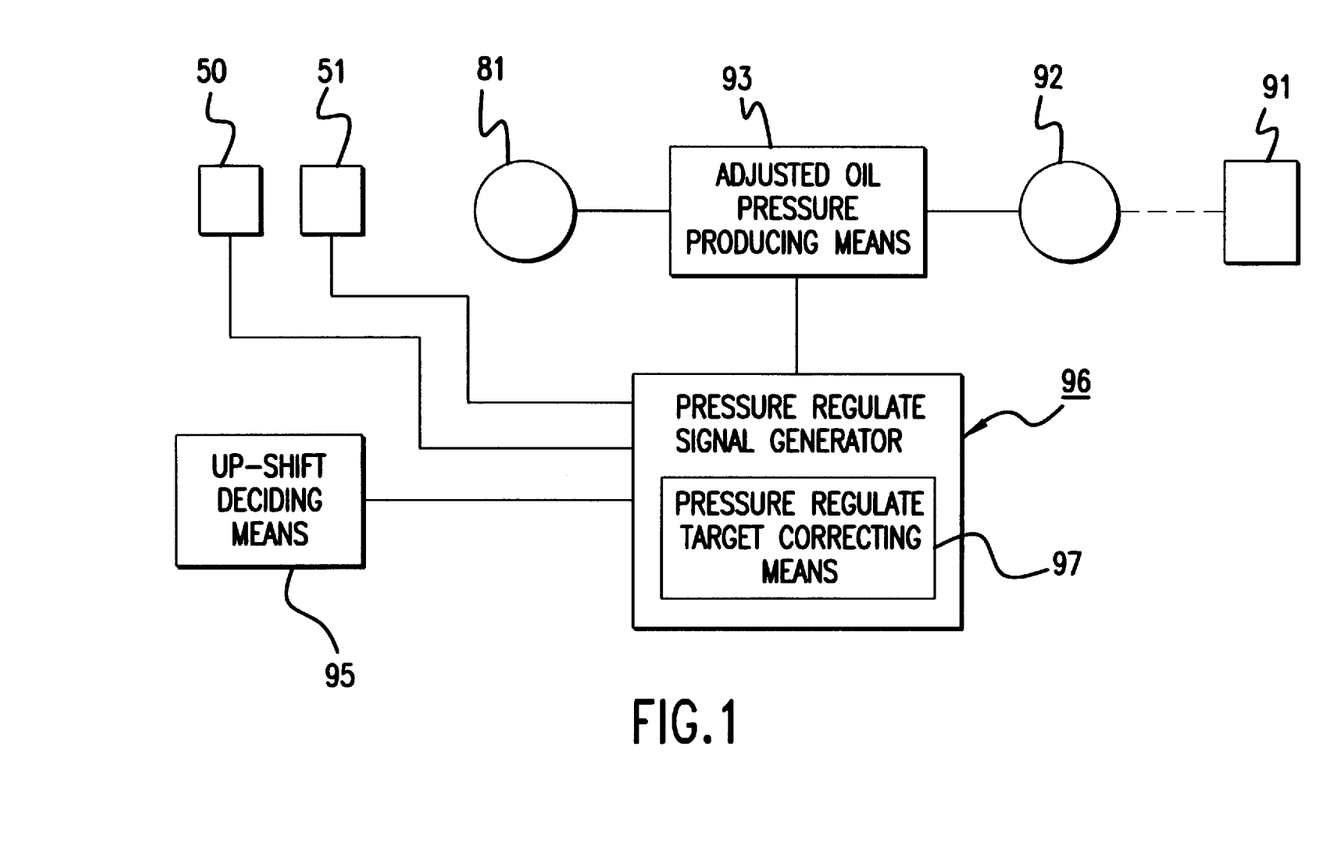
FIG. 1 is a functional block diagram showing a control system for an automatic transmission according to a first embodiment of the invention.

In FIG. 1, the control system for an automatic transmission includes: a hydraulic pump 81 acting as an oil pressure source; a frictional engagement element 91; an adjusted pressure producing means 93 for adjusting an oil pressure fed from the hydraulic pump 81 to produce the adjusted pressure $P_{TH}$; and a hydraulic servo 92 for applying/releasing the frictional engagement element 91 on the basis of the adjusted pressure.

Moreover, a throttle opening sensor 50 is arranged as an engine load detecting means for detecting the throttle opening $\theta$ as the engine load, and a vehicle speed sensor 51 acts as a vehicle speed detecting means for detecting the vehicle speed v.

In addition, an up-shift determining means 95 for determining whether the up-shift is performed, and a regulated pressure signal generating means 96 for calculating regulated target pressure of the throttle pressure $P_{TH}$, if the up-shift occurs, and to generate and output the regulate signal matching the regulated target pressure to the adjusted pressure producing means 93 are provided.

Additionally, the pressure regulate signal generating means 96 is equipped with regulated target pressure correcting means 97 for correcting the regulated target pressure on the basis of the difference between the present vehicle speed v and the vehicle speed v at a shift point for the present throttle opening $\theta$.

Figure 3:
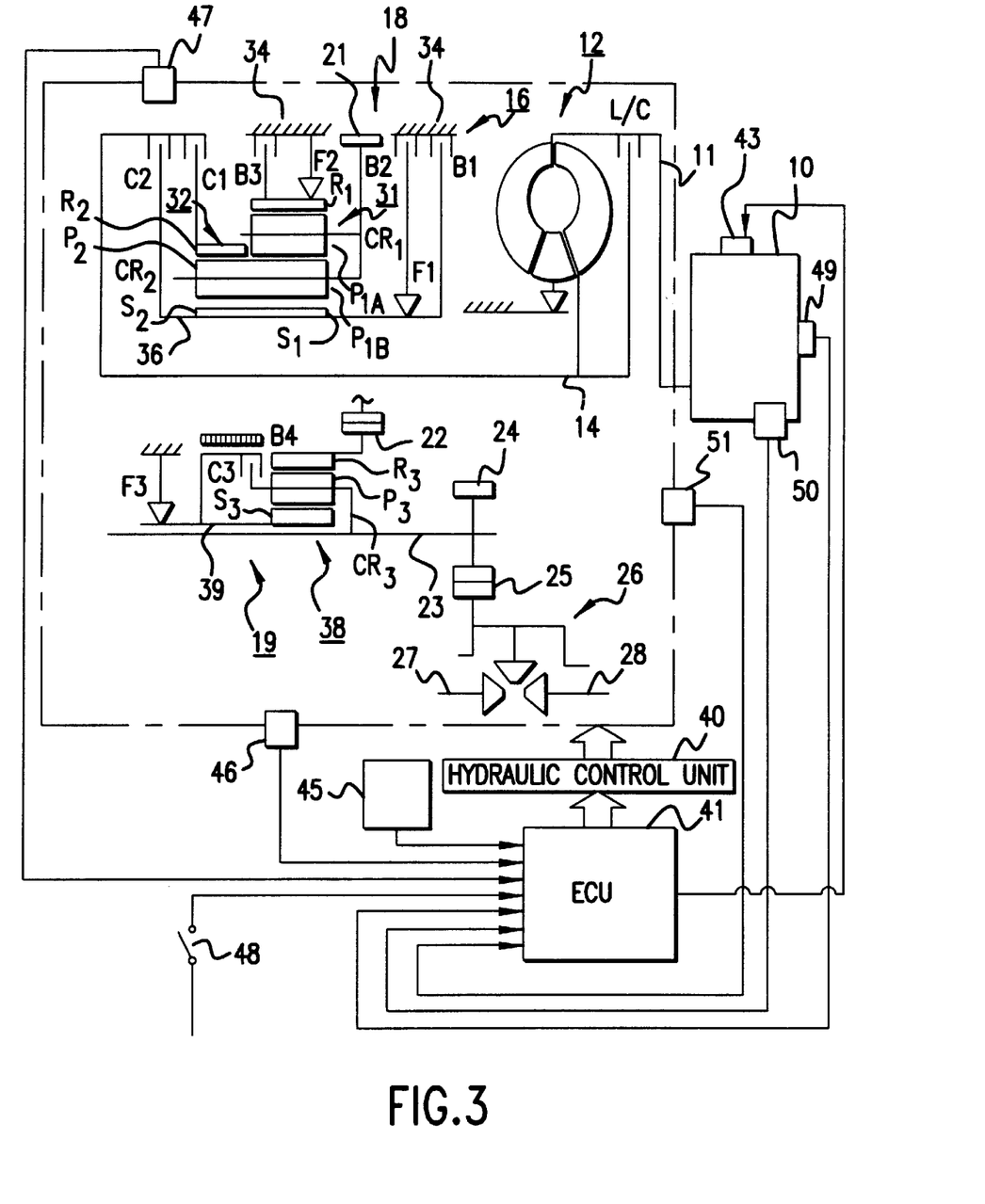
FIG. 3 is a schematic diagram showing an automatic transmission according to the first embodiment of the invention.
Figure 4:
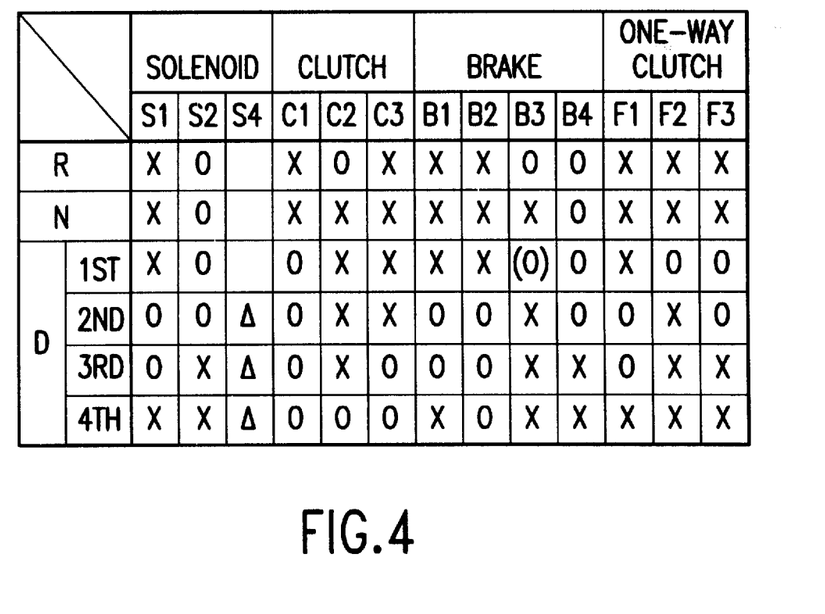
FIG. 4 is a diagram tabulating the operations of the automatic transmission according to the first embodiment of the invention.

FIG. 3 is a schematic diagram showing an automatic transmission according to the first embodiment of the invention, and FIG. 4 is a diagram tabulating the operations of the automatic transmission of the first embodiment of the invention.

As shown, the rotation, as generated by an engine 10, is transmitted through an output shaft 11 to a torque converter 12. This torque converter 12 transmits the rotation of the engine 10 through a fluid (or working oil) to an output shaft 14. When the vehicle speed v exceeds a predetermined level, a lockup clutch L/C is applied so that the rotation can be directly transmitted to the output shaft 14.

To this output shaft 14, there is connected a transmission unit 16 for establishing four forward and one reverse gear stages. This transmission unit 16 is constructed of a main transmission 18 for establishing three forward and one reverse gear stages, and an auxiliary transmission 19 for an under drive. Moreover, the rotation of the main transmission 18 is transmitted through a counter drive gear 21 and a counter driven gear 22 to the auxiliary transmission 19, and the rotation of the output shaft 23 of this auxiliary transmission 19 is transmitted through an output gear 24 and a ring gear 25 to a differential unit 26.

In this differential unit 26, the rotation, as transmitted through the output gear 24 and the ring gear 25, is differentiated so that these differential rotations are transmitted through left and right drive axles 27 and 28 to the not-shown drive wheels.

The aforementioned main transmission 18 is composed of a first planetary gear unit 31 and a second planetary gear unit 32 and is equipped with the frictional engagement element 91 (as shown in FIG. 1) including a first clutch C1, a second clutch C2, a first brake B1, a second brake B2, a third brake B3 and one-way clutches F1 and F2 so as to effect the selective torque transmissions between the individual gear elements of the first planetary gear unit 31 and the second planetary gear unit 32.

The first planetary gear unit 31 is composed of: a ring gear $R_1$ connected to a drive unit case 34 through the third brake B3 and the one-way clutch F2, as arranged in parallel with each other; a sun gear $S_1$ formed on a sun gear shaft 36 fitted around and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

In addition, the sun gear shaft 36 is connected through the second clutch C2 to the output shaft 14. The sun gear shaft 36 is further connected through the first brake B1 to the drive unit case 3 and through the one-way clutch F1 and the second brake B2, as arranged in series, to the drive unit case 34.

Furthermore, the aforementioned second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$, and formed integrally with the pinion $P_{1B}$.

On the other hand, the aforementioned auxiliary transmission 19 is composed of a third planetary gear unit 38 and is equipped with the aforementioned frictional engagement element 91 including a third clutch C3, a fourth brake B4 and a one-way clutch F3 so as to effect the selective torque transmissions between the individual gear elements of the third planetary gear unit 38.

This third planetary gear unit 38 is composed of: a ring gear $R_3$ connected to the counter driven gear 22; a sun gear $S_3$ formed on a sun gear shaft 39 rotatably fitted around the output shaft 23; a carrier $CR_3$ fixed on the output shaft 23; and a pinion $P_3$ meshing between the ring gear $R_3$ and the sun gear $S_3$ and rotatably supported by the carrier $CR_3$.

Here will be described the operations of the automatic transmission thus constructed.

In FIG. 4, reference character S1 designates a first solenoid valve; character S2 a second solenoid valve; character S4 a fourth solenoid valve; character C1 a first clutch; character C2 a second clutch; character C3 a third clutch; character B1 a first brake; character B2 a second brake; character B3 a third brake; character B4 a fourth brake; and character F1 to F3 one-way clutches. On the other hand, letter R designates a reverse running range; letter N an N-range; letter D a D-range; character 1ST a first speed gear stage; character 2ND a second speed gear stage; character 3RD a third speed gear stage; and character 4TH a fourth speed gear stage.

In addition, symbol X indicates the ON state of a first solenoid signal and a second solenoid signal for opening/closing the first solenoid valve S1 and the second solenoid valve S2, respectively; the state in which the first clutch C1, the second clutch C2, the third clutch C3, the first brake B1, the second brake B2, the third brake B3 and the fourth brake B4 are applied; and the state in which the one-way clutches F1 to F3 are locked. On the other hand, symbol ○ indicate the state in which the first solenoid signal and the second solenoid signal are OFF; the state in which the first clutch C1, the second clutch C2, the third clutch C3, the first brake B1, the second brake B2, the third brake B3 and the fourth brake B4 are released; and the state in which the one-way clutches F1 to F3 are free.

Further, symbol Δ indicates the state in which a fourth solenoid signal for opening/closing the fourth solenoid valve S4 is ON, when the lockup clutch L/C is to be applied, and a blank indicates the state in which the signal is OFF, when the lockup clutch L/C is to be released. Symbol (○) indicates the state in which the third brake B3 is to be applied at an engine braking time.

At the first speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decreased, while rotating the sun gear $S_2$ idly, and transmitting to the counter drive gear 21.

The rotation, as transmitted from the counter drive gear 21 to the counter driven gear 22, is transmitted to the ring gear $R_3$, but the rotation of the sun gear $S_3$ is blocked by the fourth brake B4 so that the rotation of the carrier $CR_3$ is further decelerated and transmitting to the output shaft 23.

At the second speed in the D-range, on the other hand, the first clutch C1, the first brake B1, the second brake B2 and the fourth brake B4 are applied, and the one-way clutches F1 and F3 are locked. Moreover, the rotation of the sun gear $S_2$ is blocked by the second brake B2 and the one-way clutch F1 so that the rotation of the ring gear $R_2$ is transmitted to the counter drive gear 21 while rotating the ring gear $R_1$ idly.

The rotation, as transmitted from the counter drive gear 21 to the counter driven gear 22, is transmitted to the ring gear $R_3$, but the rotation of the sun gear $S_3$ is blocked by the fourth brake B4 so that the rotation of the carrier $CR_3$ is decelerated and transmitted to the output shaft 23.

Next, at the third speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$, and the rotation of the sun gear $S_2$ is blocked by the second brake B2 and the one-way clutch F1. As a result, the rotation of the ring gear $R_2$ is decelerated and transmitted to the carrier $CR_2$, the rotation of which is transmitted to the counter drive gear 21 while rotating the ring gear $R_1$ idly.

The rotation, as transmitted from the counter drive gear 21 to the counter driven gear 22, is transmitted to the ring gear $R_3$, but the relative rotation between the carrier $CR_3$ and the sun gear $S_3$ is blocked by the third clutch C3 so that the third planetary gear unit 38 comes into the directly connected state. As a result, the rotation of the counter driven gear 22 is unchangedly transmitted to the output shaft 23.

Next, at the fourth speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into the directly connected states. As a result, the rotation of the output shaft 11 is unchangedly transmitted to the counter drive gear 21.

The rotation, as transmitted from the counter drive gear 21 to the counter driven gear 22, is transmitted to the ring gear $R_3$, but the relative rotation between the carrier $CR_3$ and the sun gear $S_3$ is blocked by the third clutch C3 so that the third planetary gear unit 38 comes into the directly connected state. As a result, the rotation of the counter driven gear 22 is unchangedly transmitted to the output shaft 23.

Incidentally, there is arranged in the aforementioned automatic transmission a hydraulic control unit 40 for establishing the individual gear stages by applying/releasing the first clutch C1, the second clutch C2, the third clutch C3, the first brake B1, the second brake B2, the third brake B3 and the fourth brake B4.

In the engine 10, on the other hand, there is arranged an engine control unit 43 for controlling the engine 10.

Moreover, the aforementioned hydraulic control unit 40 and engine control unit 43 are connected with an automatic transmission control unit (ECU) 41 so that they are operated according to the control programs of the automatic transmission control unit 41.

With this automatic transmission control unit 41, there are individually connected a neutral start switch 45, an oil temperature sensor 46, an RPM sensor 47, a brake switch 48, an engine RPM sensor 49, the throttle opening sensor 50 and the vehicle speed sensor 51.

Thus, the shift position, i.e., the selected range, of the not-shown shift lever can be detected by the neutral start switch 45. The temperature of the oil in the hydraulic control unit 40 can be detected by the oil temperature sensor 46. The RPM at the input side of the first clutch C1, i.e., the RPM of the output shaft 14 (as will be called the "clutch input side RPM") $N_{C1}$ can be detected by the RPM sensor 47. This clutch input side RPM $N_{C1}$ is detected as the output RPM of the torque converter 12.

Moreover, it can be detected by the brake switch 48 whether the not-shown brake pedal is depressed. An engine RPM $N_E$ can be detected by the engine RPM sensor 49. The throttle opening $\theta$ can be detected by the throttle opening sensor 50. The vehicle speed v can be detected by the vehicle speed sensor 51. Incidentally, the engine RPM $N_E$ is detected as the input RPM of the torque converter 12.

Here will be described the aforementioned hydraulic control unit 40.

Figure 5:
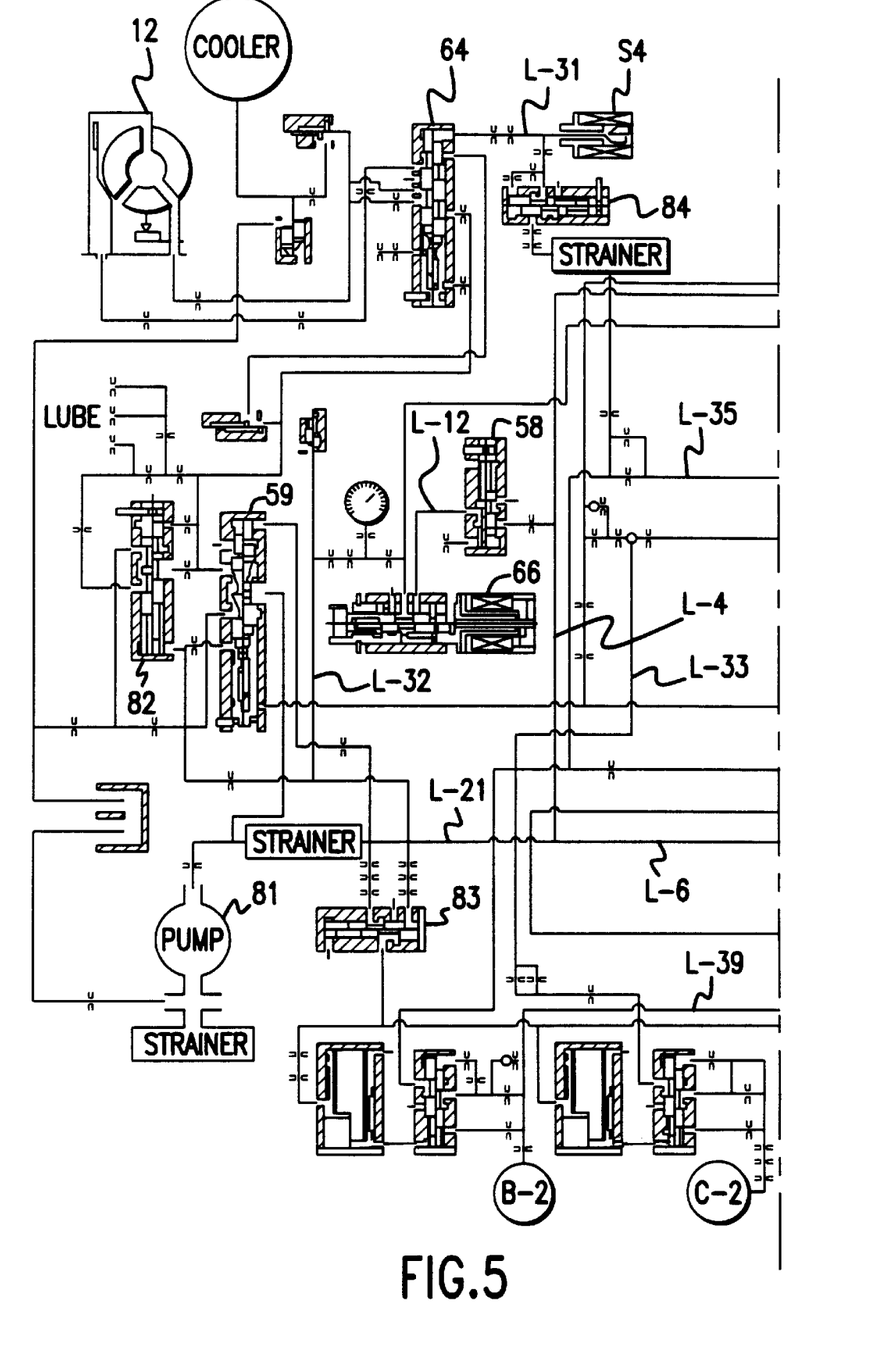
FIG. 5 is a first diagram showing a hydraulic control unit in the first embodiment of the invention.
Figure 6:
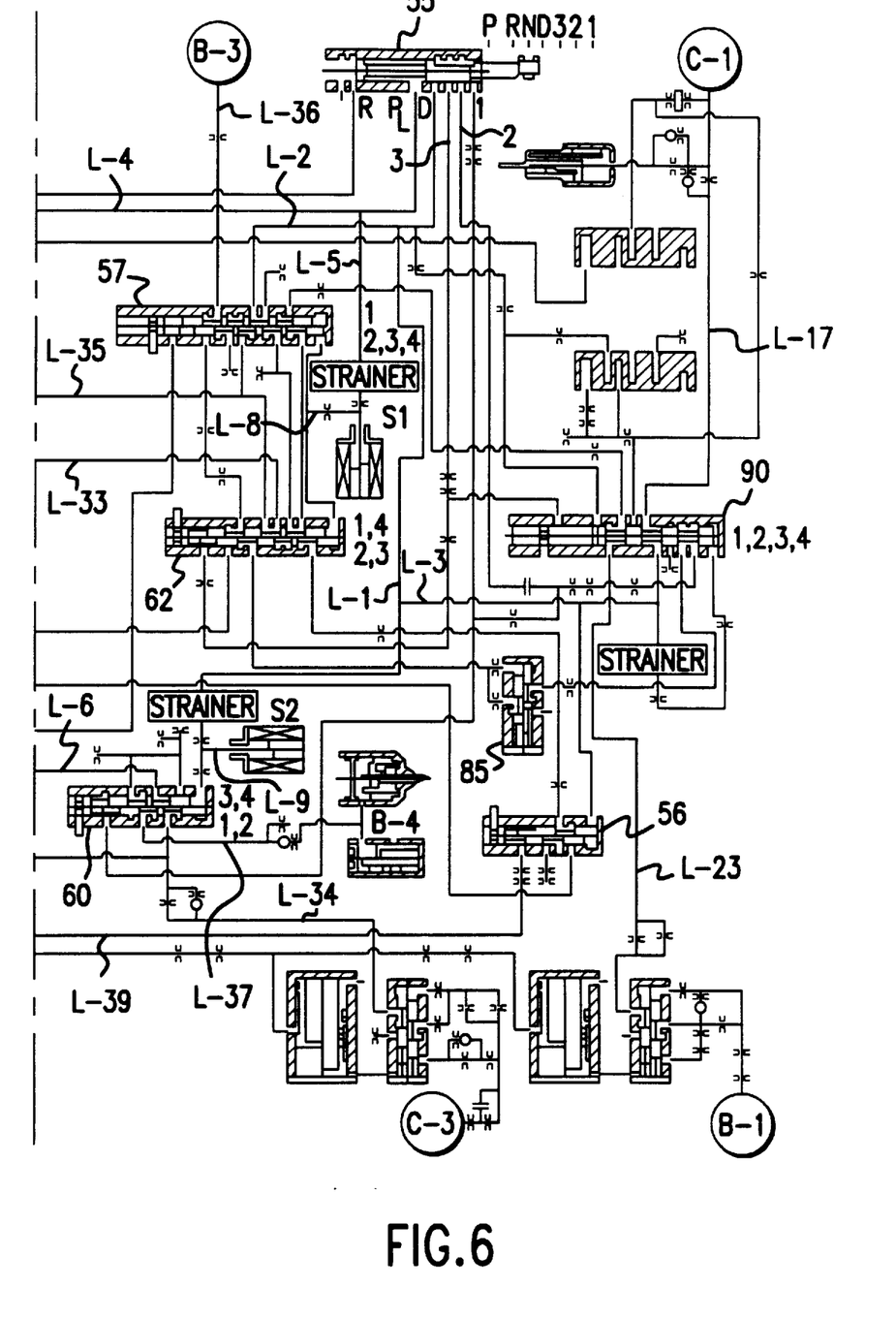
FIG. 6 is a second diagram showing a hydraulic control unit in the first embodiment of the invention.

FIG. 5 is a first diagram showing a hydraulic control unit in the first embodiment of the invention, and FIG. 6 is a second diagram showing the hydraulic control unit in the first embodiment of the invention.

As shown, a primary valve 59 adjusts the oil pressure from the hydraulic pump 81 with the throttle pressure $P_{TH}$ from the linear solenoid valve 66, and generates a line pressure as the adjusted pressure and outputs it to an oil line L-21 which branches into lines L-4 and L-6. Moreover, the manual valve (shift lever) 55 is provided with ports 1, 2, 3, D, $P_L$ and R so that the line pressure, as fed from the primary valve 59 via oil lines L-21 and L-4 to the port $P_L$, is established as the first range pressure, the second range pressure, the third range pressure, the D-range pressure and the R-range pressure, respectively, in the ports 1, 2, 3, D and R by operating the not-shown shift lever.

When this shift lever is placed in the D-range position, the oil under the D-range pressure, as established in the port D, is fed via an oil line L-1 to the second solenoid valve S2 and a 2-3 shift valve 60, via an oil line L-2 to a 1-2 shift valve 57, and via an oil line L-3 to a B-1 sequence valve 56.

Moreover, the line pressure from the oil line L-21 is fed via the oil line L-4 to a solenoid modulator valve 58, via an oil line L-5 to the first solenoid valve S1 and via an oil line L-6 to the 2-3 shift valve 60.

The first solenoid signal, the second solenoid signal and the fourth solenoid signal for opening/closing the first solenoid valve S1, the second solenoid valve S2 and the fourth solenoid valve S4, respectively, are turned ON/OFF in response to a change-over signal coming from the automatic transmission control unit 41 (as shown in FIG. 3) so that the first solenoid valve S1 feeds a signal oil pressure via an oil line L-8 to the 1-2 shift valve 57 and a 3-4 shift valve 62, so that the second solenoid valve S2 feeds a signal oil pressure via an oil line L-9 to the 2-3 shift valve 60, and so that the fourth solenoid valve S4 feeds a signal oil pressure via an oil line L-31 to a lockup control valve 64.

The 1-2 shift valve 57 takes an upper half position (as located at the upper position of the spool) at the first speed and a lower half position (as located at the lower position of the spool) at the second to fourth speeds; the 2-3 shift valve 60 takes the lower half position at the first and second speeds and the upper half position at the third and fourth speeds; and the 3-4 shift valve 62 takes the upper half position at the first and fourth speeds and the lower half position at the second and third speeds.

The solenoid modulator valve 58 is connected via an oil line L-12 to a linear solenoid valve 66, and this linear solenoid valve 66 is further connected via the oil line L-32 to the primary valve 59, a secondary valve 82 and an accumulator control valve 83. This accumulator control valve 83 adjusts the back pressure of an accumulator which is arranged in each hydraulic servo 92. Incidentally, the linear solenoid valve 66 and the primary valve 59 described above constitute the adjusted oil pressure producing means 93 (as shown in FIG. 1).

Moreover, the 1-2 shift valve 57 is connected via an oil line L-35 to a hydraulic servo B-2 and via an oil line L-36 to a hydraulic servo B-3. The 2-3 shift valve 60 is connected via an oil line L-37 to a hydraulic servo B-4. The 3-4 shift valve 62 is connected via an oil line L-33 to a hydraulic servo C-2. The 2-3 shift valve 60 is connected via an oil line L-43 to a hydraulic servo C-3. The neutral control valve 90 is connected via an oil line L-17 to a hydraulic servo C-1 and via an oil line L-23 to a hydraulic servo B-1.

On the other hand, the B-1 sequence valve 56 receives the D-range pressure via the oil line L-3 in the control oil chamber at the first speed to take the lower half position and receives, when the oil pressure is fed to the hydraulic servo B-2 to rise to the second speed, the sequence pressure from the hydraulic servo B-2 via an oil line L-39 to take the upper half position.

Incidentally, the numeral 12 designates the torque converter; numeral 84 designates a lockup modulator valve; and numeral 85 designates a low modulator valve.

In the vehicle having the automatic transmission thus described, when the driver operates the shift lever, the range can be selected, and the vehicle can be accelerated by depressing the not-shown accelerator pedal.

Moreover, the automatic transmission control unit 41 is equipped with the shift map so that it determines a gear stage to perform the shift by referring to the shift map on the basis of the throttle opening $\theta$ and the vehicle speed v.

If, however, the accelerator pedal is being depressed as the vehicle is driven and the accelerator pedal is abruptly released, the throttle opening $\theta$ decreases although the vehicle speed v remains high, so that the operation point in the shift map exceeds the shift point to effect the off-up shift.

If this off-up shift is executed, the torque capacity of each frictional engagement element 91 exceeds the necessary value.

At the off-up shift, therefore, the regulated target pressure of the line pressure is corrected by correcting the throttle pressure $P_{TH}$ which is produced by the linear solenoid valve 66.

Specifically, when an up-shift from the first speed to the second speed is executed in the automatic transmission provided, the second brake B2 is applied, and the first brake B1 is then applied by the sequence pressure coming from the hydraulic servo B-2. At the time of an up-shift from the second speed to the third speed, on the other hand, the third clutch C3 is applied. At the time of an up-shift from the third speed to the fourth speed, moreover, the second clutch C2 is applied.

At the time of the up-shift, therefore, the throttle pressure $P_{TH}$ can be corrected to adjust the oil pressure to be fed to the second clutch C2, the third clutch C3 and the second brake B2.

Thus, the regulated target pressure of the throttle pressure $P_{TH}$ is set by the following formula so that it is corrected with an off-up correction value α at the time of the off-up shift:

$$P_{TH} P_{THGEAR} \pm \delta + \alpha \quad (1)$$

wherein

PTHGEAR=a steady pressure,

δ=a reduction, and

α=an off-up correction value.

Moreover, a regulate signal matching the corrected regulated target pressure is generated in the automatic transmission control unit 41 and is outputted to the linear solenoid valve 66.

Here, the steady pressure $P_{THGEAR}$ is set at each gear stage and is changed when a shift is executed. Moreover, the reduction δ is so suitably set as to prevent the shock or to shorten the shift time for an ordinary up-shift or down-shift, and takes a positive value and a negative value.

Moreover, the off-up correction value α is set by the following formula:

$$\alpha = m \cdot (v_R - v_M) \quad (2)$$

wherein m=a correction constant, $v_R$=a present vehicle speed, and $v_M$=a shift point vehicle speed.

Here, the correction constant m is preset for each automatic transmission and takes a negative value. On the other hand, the present vehicle speed $v_R$ is the vehicle speed v which is detected at each sampling time of the automatic transmission control unit 41 and corresponds to the vehicle speed v2 in FIG. 2. Moreover, the shift point vehicle speed $v_M$ is the vehicle speed at the shift point when the shift is executed with the present throttle opening θ and corresponds to the vehicle speed v1 in FIG. 2.

In this case, the shift point vehicle speed $v_M$ can be determined merely by referring to the shift map which is stored in the not-shown memory of the automatic transmission control unit 41, so that the off-up correction value α can be calculated merely by calculating the difference between the present vehicle speed $v_R$ and the shift point vehicle speed $v_M$ and by multiplying the difference by the correction constant m.

As a result, the control operation by the automatic transmission control unit 41 for determining the off-up correction value α can be simplified. In addition, any special map for determining the off-up correction value α need not be prepared, but an ordinary shift map can be utilized to reduce the cost.

Thus, at the time of the off-up shift, the throttle pressure $P_{TH}$ can be corrected to lower the oil pressure for applying the frictional engagement element 91 so that the shock can be prevented from occurring in accordance with the application of the frictional engagement element 91.

Here will be described the operations of the control system for the automatic transmission according to the present embodiment.

Figure 7:
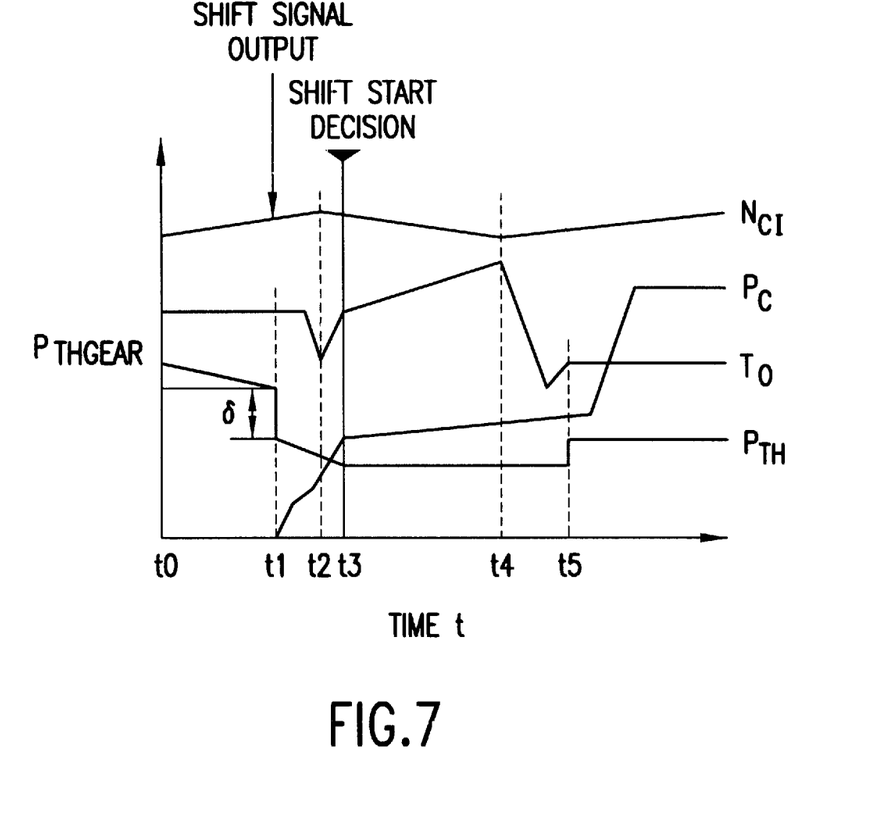
FIG. 7 is a time chart showing the control system for the automatic transmission according to the first embodiment of the invention.

FIG. 7 is a time chart showing the control system for the automatic transmission according to the first embodiment of the invention. In FIG. 7, the abscissa indicates the time t, and the ordinate indicates the clutch input side RPM $N_{C1}$, an oil pressure Pc to be fed to the hydraulic servo 92 of the predetermined frictional engagement element 91 (as shown in FIG. 1), an output torque To, and the throttle pressure $P_{TH}$.

First of all, if the accelerator pedal is released at timing t0 while the vehicle is driven and while being accelerated by depressing the not-shown accelerator pedal, the clutch input side RPM $N_{C1}$ is gradually raised as it is by the inertia, but the throttle pressure $P_{TH}$ is also gradually lowered as the throttle opening θ is gradually decreased.

At a timing t1, moreover, the first solenoid signal and the second solenoid signal are outputted as the shift signals from the automatic transmission control unit 41 (as shown in FIG. 3) to the hydraulic control unit 40 so that the oil pressure Pc for applying/releasing the predetermined frictional engagement element 91 (as shown in FIG. 1) is fed to the hydraulic servo 92.

At this time, the throttle pressure $P_{TH}$ is lowered to a level lower by the reduction δ than the steady pressure $P_{THGEAR}$. The off-up correction value α is gradually raised at every sampling time. As a result, the throttle pressure $P_{TH}$ is gradually lowered.

Subsequently, at a timing t2, the hydraulic servo 92 is filled up with the oil so that the rising rate of the oil pressure Pc rises whereas the clutch input side RPM $N_{C1}$ begins decreasing.

When the shift start is detected at a timing t3, the off-up correction value α is fixed at that value. Incidentally, the shift start can be detected depending upon whether the ratio between the engine RPM $N_E$ and the vehicle speed v exceeds a set value or whether the ratio between the clutch input side RPM $N_{C1}$ and the vehicle speed v exceeds a set value.

Thus, the correction of the throttle pressure $P_{TH}$ is started at the timing t1, and the off-up correction value α is gradually increased at every sampling time t1 to t3, so that the throttle pressure $P_{TH}$ can be set to a proper value before the shift start is detected at the timing t3.

Next, at a timing t4, the play of the frictional engagement element 91 changes from a dragging state to a slip state so that the clutch input side RPM $N_{C1}$ begins rising.

When the shift end is detected at a timing t5, the off-up correction value a is set to 0. Incidentally, this shift end can be detected depending upon whether the ratio between the engine RPM $N_E$ and the vehicle speed v is below a set value or whether the ratio between the clutch input side RPM $N_{C1}$ and the vehicle speed v is below a set value.

Figure 8:
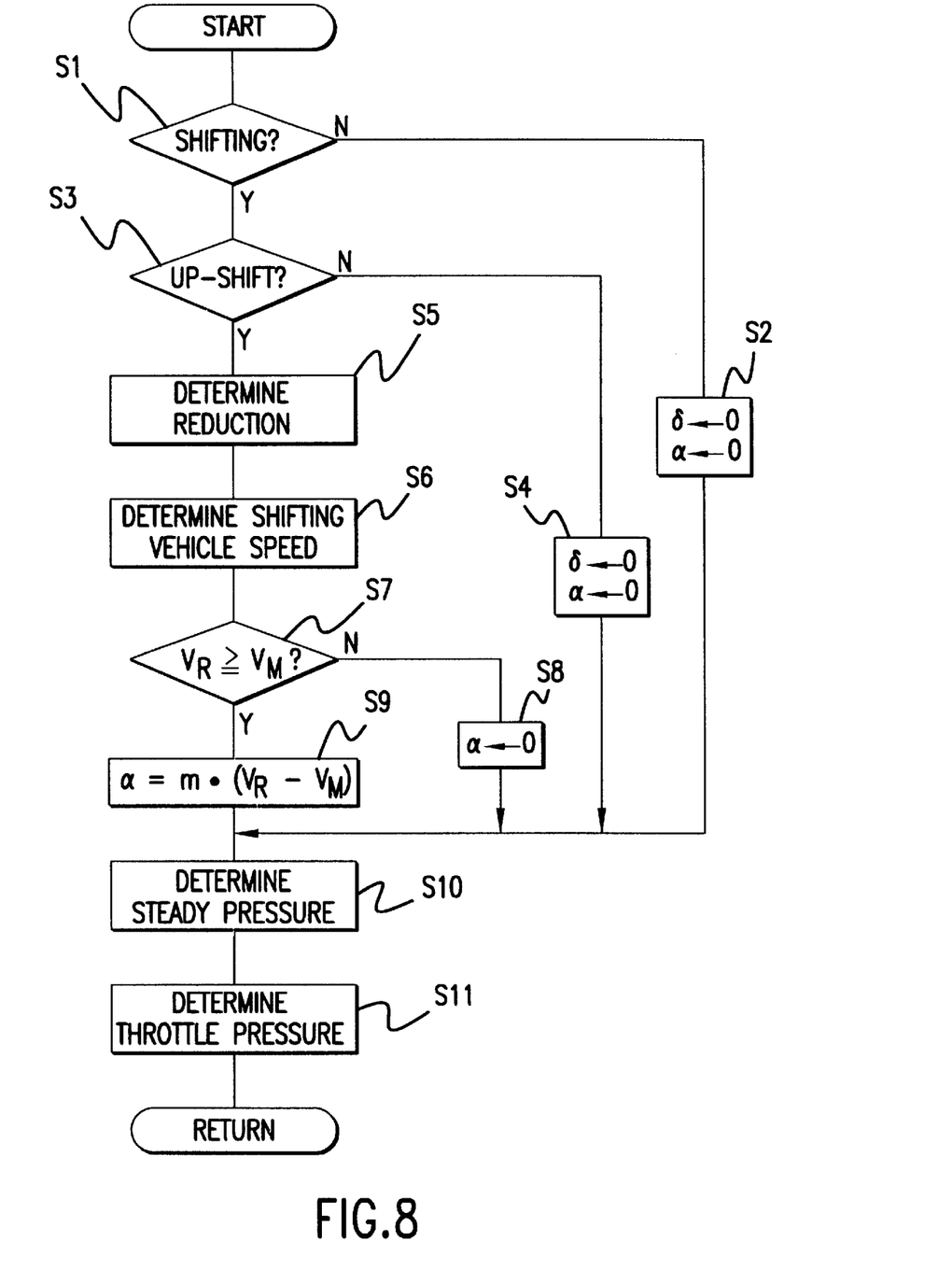
FIG. 8 is a flow chart showing the operations of the control system for the automatic transmission in the first embodiment of the invention.

FIG. 8 is a flow chart illustrating the operations of the control system for the automatic transmission according to the first embodiment of the invention. The steps are as follows:

Step S1: It is determined whether the vehicle is shifting. The routine advances to Step S2 if not shifting, and to Step S3 if shifting. In this case, it is assumed that the vehicle is shifting at the timings t1 to t5 of FIG. 7.

Step S2: The reduction δ and the off-up correction value α are set to 0. As a result, the regulated target pressure of the throttle pressure $P_{TH}$ is not corrected.

Step S3: The up-shift deciding means 95 (as shown in FIG. 1) of the automatic transmission control unit 41 (as shown in FIG. 3) determines whether the up-shift has been executed. The routine advances to Step S5, if the up-shift is executed, but to Step S4 if not.

Step S4: The reduction δ and the off-up correction value α are set to 0. As a result, the regulated target pressure of the throttle pressure $P_{TH}$ is not corrected.

Step S5: With reference to the line pressure adjusting map stored in the not-shown memory of the automatic transmission control unit 41, the reduction δ, which is present for each kind of shift is determined.

Step S6: With reference to the shift map stored in the memory of the automatic transmission control unit 41, the shift point vehicle speed $v_M$ is determined.

Step S7: It is determined whether the present vehicle speed $v_R$ is over the shift point vehicle speed $v_M$. The routine advances to Step S9, if the present vehicle speed $v_R$ is over the shift point vehicle speed $v_M$, but to Step S8 if not.

Step S8: It is determined that the ordinary up-shift has been executed, the off-up correction value α is set to 0.

Step S9: The regulated target pressure correcting means 97 of the automatic transmission control unit 41 determines that the off-up shift has been executed, and calculates the off-up correction value α by the formula (2).

Step S10: The steady pressure $P_{THGEAR}$ is determined with reference to the line pressure map which is set to match the engine torque and is stored in the memory of the automatic transmission control unit 41.

Step S11: The regulate signal generating means 96 of the automatic transmission control unit 41 calculates the throttle pressure $P_{TH}$ by the formula (1) on the basis of the reduction δ and the off-up correction value α, which are determined at Steps S2, S4, S8 and S9, and the steady pressure $P_{THGEAR}$ which is determined at Step S10.

In this embodiment, the off-up correction value α is set on the basis of the difference between the present vehicle speed $v_R$ and the shift point vehicle speed $v_M$ but can also be set to match the shift kind and the throttle opening θ. In this case, the correction constant m can be replaced by a torque curve matching correction value k, which can be determined by referring to the torque curve matching correction value table stored in the memory of the automatic transmission control unit 41.

Figure 9:
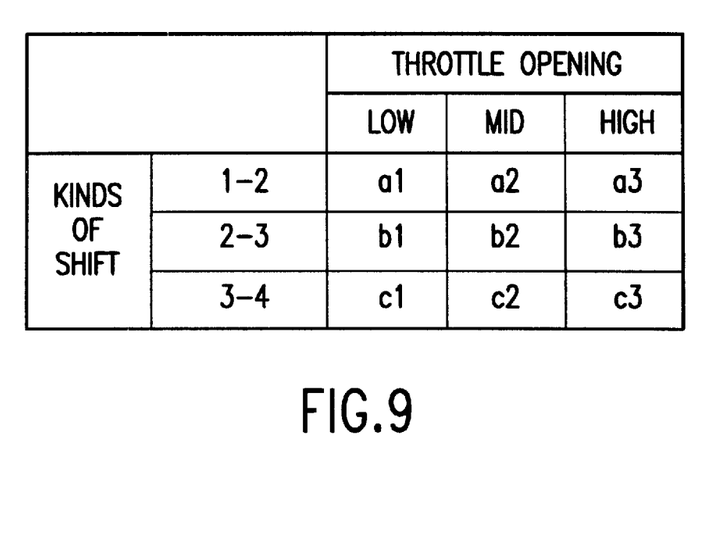
FIG. 9 is a diagram showing a torque curve matching correction value table in a second mode of embodiment of the invention.

FIG. 9 is a diagram illustrating the torque curve matching correction value table in a second mode of embodiment of the invention.

In this case, the kinds of shift are divided into the up-shift (1-2) from the first speed to the second speed, the up-shift (2-3) from the second speed to the third speed, and the up-shift from the third speed to the fourth speed, and the throttle opening θ is divided into a small region LOW, a medium region MID and a large region HIGH.

At the up-shift from the first speed to the second speed in the present embodiment, the torque curve matching correction value k is set to a1, a2 and a3, when the throttle opening θ is in the small region LOW, the medium region MID and the large region HIGH, respectively. Likewise, the torque curve matching correction value k at the up-shift from the second speed to the third speed is set to b1, b2 and b3, and the torque curve matching correction value k at the up-shift from the third speed to the fourth speed is set to c1, c2 and c3. Incidentally, all of the torque curve matching correction values k take negative values.

In this case, the off-up correction value α can be additionally corrected according to the shifting characteristics of each kind of shift and the characteristics of the frictional engagement element 91 (as shown in FIG. 1) to be applied at the shifting time so that the regulate adjust value of the throttle pressure $P_{TH}$ can be adequately corrected for each kind of shift.

Moreover, the off-up correction value α can also be corrected according to the input torque T so that the regulate adjust value of the throttle pressure $P_{TH}$ can be adequately corrected when the throttle opening θ fluctuates.

In the aforementioned invention, the shock is prevented from occurring in accordance with the application of the frictional engagement element 91 by lowering the oil pressure for applying the frictional engagement element 91 when the off-up shift is executed. However, this prevention can also be applied to a kick-down shift.

Specifically, at this kick-down shift, the not-shown accelerator pedal is abruptly depressed so that the throttle opening θ is enlarged to exceed the shift point. Contrary to the off-up shift, therefore, the oil pressure for applying the frictional engagement element 91 cannot be sufficiently raised to elongate the application time and accordingly the shift time.

Thus, the shift time can be shortened by correcting the throttle pressure $P_{TH}$ when the kick-down shift is executed.

In this case, the off-up correction value α in the present embodiment is replaced by the kick-down correction value β which is set by the following formula:

$$\beta = n \cdot (v_R - v_M),$$

wherein n=a correction constant, $v_R$=the present vehicle speed, and $v_M$=the shift point vehicle speed.

Here, the correction constant n is preset for each automatic transmission and takes a positive value. In this case, the kick-down correction value β can also be set to match the shift kind and the throttle opening θ.

In the present embodiment, the line pressure is produced as the adjusted oil pressure by the primary valve 59 (as shown in FIG. 5), but an accumulator back pressure can also be produced as the adjusted oil pressure by the accumulator control valve 83.

While this invention has been described in as conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A control system for an automatic transmission, comprising:

a frictional engagement element;

adjusted oil pressure producing means for adjusting an oil pressure supplied from an oil pressure source to produce an adjusted oil pressure;

a hydraulic servo for applying/releasing the frictional engagement element on the basis of the adjusted oil pressure;

engine load detecting means for detecting an engine load;

vehicle speed detecting means for detecting a vehicle speed;

up-shift determining means for determining whether an up-shift has been executed; and pressure regulate signal generating means for calculating the regulated target pressure of the adjusted oil pressure, when the up-shift is executed, to generate and output a pressure regulate signal matching the regulated target pressure to the adjusted oil pressure producing means, wherein the adjusted pressure signal producing means includes regulated target pressure correcting means for correcting the regulated target pressure on the basis of the difference between a present vehicle speed and a vehicle speed at a shift point when the shift is executed under the engine load.

2. The control system for an automatic transmission according to claim 1, wherein the regulated target pressure correcting means also corrects the regulated target pressure in accordance with the kind of shift.

3. The control system for an automatic transmission according to claim 1, wherein the regulated target pressure correcting means also corrects the regulated target pressure in accordance with the engine load based on torque converter characteristics.

4. The control system for an automatic transmission according to clam 1, wherein the regulated target pressure correcting means corrects the regulated target pressure during a time period from an output of a shift signal to the detection of a shift start.

5. A method of controlling an automatic hydraulic transmission of a vehicle having an engine, comprising the steps of:

adjusting an oil pressure supplied from an oil pressure source to produce an adjusted oil pressure;

detecting an engine load;

detecting a vehicle speed;

determining whether an up-shift has been executed;

calculating a regulated target pressure of the adjusted oil pressure, when the up-shift is executed, and generating and outputting a pressure regulate signal matching the regulated target pressure;

correcting the regulated target pressure based on the difference between a present vehicle speed and a vehicle speed at a shift point when the shift is executed under the engine load.

6. The method according to claim 5, wherein the step of correcting the regulated pressure occurs during a time period from an output of a shift signal to the detection of a shift start.

7. The method according to claim 5, wherein the step of correcting the regulated target pressure further includes correcting the regulated target pressure in accordance with the kind of shift.

8. The method according to claim 5, wherein the step of correcting the regulated pressure further includes correcting the regulated target pressure in accordance with the engine load based on torque converter characteristics.

* * * * *